(12) United States Patent
Kratzer et al.

(10) Patent No.: US 12,435,220 B2
(45) Date of Patent: Oct. 7, 2025

(54) BRIGHT RICE BRAN WAX OXIDATED WITH HIGH ESTERANE CONTENT

(71) Applicant: CLARIANT INTERNATIONAL LTD, Muttenz (CH)

(72) Inventors: Philipp Kratzer, Wertingen (DE); Manuel Broehmer, Gröbenzell (DE); Rainer Fell, Gersthofen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 439 days.

(21) Appl. No.: 17/768,238

(22) PCT Filed: Oct. 5, 2020

(86) PCT No.: PCT/EP2020/077785
§ 371 (c)(1),
(2) Date: Apr. 12, 2022

(87) PCT Pub. No.: WO2021/073910
PCT Pub. Date: Apr. 22, 2021

(65) Prior Publication Data
US 2024/0117187 A1 Apr. 11, 2024

(30) Foreign Application Priority Data
Oct. 15, 2019 (EP) .................... 19203445

(51) Int. Cl.
*C08L 91/06* (2006.01)
*C09D 11/12* (2006.01)
*C09D 191/06* (2006.01)

(52) U.S. Cl.
CPC .......... *C08L 91/06* (2013.01); *C09D 11/12* (2013.01); *C09D 191/06* (2013.01)

(58) Field of Classification Search
None
See application file for complete search history.

(56) References Cited

U.S. PATENT DOCUMENTS

| | | |
|---|---|---|
| 3,971,751 A | 7/1976 | Isayama |
| 3,988,331 A | 10/1976 | Korbanka |
| 4,340,534 A | 7/1982 | Wiezer |
| 4,404,015 A | 9/1983 | Menon |
| 5,274,144 A | 12/1993 | Wuest et al. |
| 5,969,014 A | 10/1999 | Webster |
| 6,077,896 A | 6/2000 | Yano |
| 6,174,940 B1 | 1/2001 | Stahrfeldt |
| 6,270,692 B1 | 8/2001 | Geissler |
| 6,521,681 B1 | 2/2003 | Zingg |
| 6,790,903 B1 | 9/2004 | Majolo |
| 6,916,867 B2 | 7/2005 | Gugumus |
| 7,297,734 B2 | 11/2007 | Mehrer |
| 8,343,304 B2 | 1/2013 | Burckhardt |
| 9,447,279 B2 * | 9/2016 | Herrlich ............... C11C 3/006 |
| 10,676,618 B2 | 6/2020 | Broehmer et al. |
| 10,920,623 B2 | 2/2021 | Nagayama et al. |
| 2002/0198308 A1 | 12/2002 | Lucas |
| 2003/0105261 A1 | 6/2003 | Komitsu |
| 2005/0228086 A1 | 10/2005 | Mehrer |
| 2005/0250889 A1 | 11/2005 | Malik |
| 2006/0052491 A1 | 3/2006 | Braig |
| 2009/0194004 A1 | 8/2009 | Meyer |
| 2010/0087576 A1 | 4/2010 | Prasse |
| 2015/0247039 A1 | 9/2015 | Herrlich |
| 2015/0284661 A1 | 10/2015 | Herrlich et al. |
| 2016/0060463 A1 | 3/2016 | Weber et al. |

FOREIGN PATENT DOCUMENTS

| | | |
|---|---|---|
| CL | 199902919 | 9/2000 |
| CN | 1444624 A | 9/2003 |
| CN | 101824163 A | 9/2010 |
| CN | 103025809 A | 4/2013 |
| CN | 104619781 A | 5/2015 |
| CN | 104640930 A | 5/2015 |
| CN | 106833479 A | 6/2017 |
| CN | 107892900 A | 4/2018 |
| CN | 108048222 A | 5/2018 |
| CN | 108129302 A | 6/2018 |
| CN | 108191602 A | 6/2018 |
| CN | 109852482 A | 6/2019 |
| DE | 4019167 A1 | 12/1991 |
| DE | 19958525 A1 | 6/2000 |
| DE | 10231886 A | 2/2004 |
| DE | 102013007638 A1 | 11/2014 |
| DE | 102018116113 A1 | 1/2020 |
| EP | 1288247 A1 | 3/2003 |
| EP | 1925628 A1 | 5/2008 |
| EP | 1343454 B1 | 12/2009 |
| EP | 2909274 A1 | 8/2015 |
| EP | 2909273 B1 | 10/2016 |
| GB | 1440391 A | 6/1976 |
| JP | S36-5526 B | 5/1961 |
| JP | S49-90739 A | 8/1974 |
| JP | S60-11553 A | 1/1985 |
| JP | H10-7862 A | 1/1998 |
| JP | 2000010337 A | 1/2000 |
| JP | 2003292987 A | 10/2003 |
| JP | 2004506055 A | 2/2004 |
| JP | 2010-020304 A | 1/2010 |
| JP | 2010248408 A | 11/2010 |
| JP | 2010270241 A | 12/2010 |
| JP | 2013535535 A | 9/2013 |
| JP | 2015536356 A | 12/2015 |
| JP | 2018-520245 A | 7/2018 |
| JP | 2020-020304 A | 2/2020 |
| KR | 20150076218 A | 7/2015 |
| KR | 20150076219 | 7/2015 |

(Continued)

OTHER PUBLICATIONS

Machine Translation JPS365526 (Year: 1961).*

(Continued)

*Primary Examiner* — Michael Forrest

(57) ABSTRACT

The invention relates to rice bran wax oxidates with an average acid value, to a process for their production and to their use for agricultural or forestry purposes, as an additive in plastics processing, in care products, in printing inks and/or in paints, and to saponified rice bran wax oxidates produced by saponifying the claimed rice bran wax oxidates.

20 Claims, No Drawings

(56) References Cited

FOREIGN PATENT DOCUMENTS

| RU | 2197508 C2 | 1/2003 |
|---|---|---|
| RU | 2513108 C2 | 4/2014 |
| WO | 0212385 A1 | 2/2002 |
| WO | 2012010570 A1 | 1/2012 |
| WO | 2014/060081 A1 | 4/2014 |
| WO | 2014/060082 A1 | 4/2014 |
| WO | 2014/131514 A1 | 9/2014 |
| WO | 2014/166614 A1 | 10/2014 |
| WO | 2015117757 A1 | 8/2015 |
| WO | 2016081823 A1 | 5/2016 |
| WO | 2017009408 A1 | 1/2017 |
| WO | 2017/108542 A1 | 6/2017 |

OTHER PUBLICATIONS

International Preliminary Report on Patentability (IPRP) dated Jun. 7, 2021, issued in corresponding International patent Application No. PCT/EP2020/069511, 6 pages.
International Search Report (with partial translation) and Written Opinion dated Jan. 12, 2021, issued in corresponding International Patent Application No. PCT/EP2020/077786.
International Search Report and Written Opinion dated Oct. 14, 2020, issued in corresponding International Patent Application No. PCT/EP2020/069511, 8 pages.
Abhirami et al., "Characterization of Refined Rice Bran Wax: An Alternative Edible Coating", Int. J. Curr. Microbial. App. Sci. (2019), 8(5), pp. 91-97.
Anonymous, Adding Shaping flexibility and smoothness to plastics Kicocare RBW vita based on renewable feedstock, Licocare RBW, Jan. 1, 2020, pp. 1-2, Internet, www.clariant.com.
Anonymous, "Chromic Acid", Nov. 1, 2020, https://en.wikipedia.org/w/index.php?title=Chromic_acid&oldid=986575868.
Anonymous, "Cycle time reduction and smoother plastics processing Licocare 360 TP VITA", Licocare 360 TP VITA, Oct. 1, 2019, pp. 1-2, Internet, www.clariant.com.
Anonymous, "Improved color dispersion in plastics with micronized rice bran wax (brocure)", Licocare-RBW, Sep. 1, 2019, pp. 1-2, Internet, www.clariant.com.
Anonymous, "Jones Oxidation", Apr. 11, 2020 https://en.wikipedia.org/w/index.php?title=Jones_oxidation&oldid=971372165.
Anonymous, "Jones Reagent", Apr. 11, 2020 https://www.organic-chemistry.org/chemicals/oxidations/jones-reagent.shtm.
Anonymous, "Licocare RBW bio-based lubricating and dispersing agents", Licocare RBW, Jan. 1, 2020, pp. 1-9, Internet, www.clariant.com.
Anonymous, "Lubricants for plastic processing Licowax, Licolub, Licocene, Licomont", May 11, 2020, pp. 1-8.
Anonymous, "Sustainability Data Sheet Licocare RBW 102 TP", Licocare RBW 102 TP, Oct. 1, 2018, pp. 1-2, Internet, www.clariant.com.
Anonymous, "Sustainability Data Sheet Licocare RBW 106 TP", Licocare RBW 106 TP, Oct. 1, 2018, pp. 1-2, Internet, www.clariant.com.
Anonymous, "Sustainability Data Sheet Licocare RBW 300 TP", Licocare RBW 300 TP, Oct. 1, 2018, pp. 1-2, Internet, www.clariant.com.
Bräutigam, "Lexikon der kosmetischen Rohstoffe", Norderstedt, 2010, 77.
Buffa, "Rice Bran Wax. A new wax for cosmetics, drugs, and toiletries", Cosmetics & Toiletries, Technology Report, vol. 91, Oct. 1976, pp. 14-16.
Ju et al., "Rice Bran oil as a potential resource for biodiesel", Journal of Scientific & Industrial Research, 2005, pp. 866-882, 64.
Kim, "Wax extraction and characterization from full-flat and defatted rice bran", Thesis (2008) pp. 1-136, US LSU Doctoral Dissertations. 886, https://digitalcommons.lsu.edu/gradschool_dissertations/886.
Maru et al., "Studies on Physico-Chemical Properties of Rice Bran Wax and its Comparison with Camauba Wax", Int. J. Pharm. Phytopharmacol. Res. (2012) 1(4): 203-207.
Hofmann, "Development of an Economically and Environmentally Sustainable Method for the Oxidation of Rice Bran Wax", Thesis, Jun. 13, 2018.
Ullmann's Encyclopedia of Industrial Chemistry 5th ed., 1996, 117, A28.
Yoon et al., "Composition of waxes from crude rice bran oil", JAOCS, vol. 59, Issue 12, Dec. 1982, pp. 561-563.
International Search Report (with partial translation) and Written Opinion dated Jan. 12, 2021, issued in corresponding International Patent Application No. PCT/EP2020/077785.
International Search Report (with partial translation) and Written Opinion dated Jan. 12, 2021, issued in corresponding International Patent Application No. PCT/EP2020/077782 (15 pages).

* cited by examiner

BRIGHT RICE BRAN WAX OXIDATED WITH HIGH ESTERANE CONTENT

The invention relates to light-coloured rice bran wax oxidates having a high ester content and a moderate acid number, to a process for producing these oxidation products of rice bran wax and to the use thereof for agriculture or forestry purposes, as additive in plastics processing, in care products, in printing inks and/or in paints. Also provided are saponified rice bran wax oxidates produced by the saponification of the rice bran wax oxidates according to the invention.

The oxidation of fossil and nonfossil natural waxes with chromosulfuric acid has been known since the early 20th century and has been performed in industry using fossil montan waxes since 1927 in the "Gersthofen process" which is still being operated today. As well as fossil montan wax, it is also possible to use these chromic acid-based processes to oxidize renewable natural waxes, for example carnauba wax and candelilla wax. A process for chromic acid oxidation of carnauba wax was described in 2004 by DE-A 10231886. However, carnauba waxes in their natural state (fatty grey, type 4; mid-yellow, prime yellow and gauze, types 3 to 1) and raw montan wax (black) are distinctly dark-coloured. Oxidation with chromosulfuric acid leads to lighter-coloured wax products. However, chromic acid bleaching of these natural waxes, depending on the amount of chromic acid used, usually leads to high acid numbers, typically in the range from 130 to 160 mg KOH/g.

Oxidation with chromic acid results essentially in cleavage of the wax esters and in situ oxidation of the wax alcohols formed to give wax acids. The acid number level is a measure of the content of free wax acids. Typical conversions in such oxidations are in the range of 50-90% based on the ester groups. The natural waxes bleached in this way, in addition to the desired lightening, have a higher saponification number and acid number than the unbleached waxes, which is undesirable in some applications. However, rice bran wax oxidates having a higher acid number are easier to derivatize, for example by esterification.

For some applications, it is advantageous when the acid number remains relatively low, but still high enough to enable derivatizations to a crucial degree. The acid number of the wax oxidates can be lowered, for example, by esterifying the acids present in the wax and/or wax oxidate with alcohols.

This esterification is frequently undertaken with polyvalent alcohols, for example ethylene glycol, butylene glycol or glycerol. However, this is associated with an additional step, which is disadvantageous for reasons of process economy.

One natural wax of economic interest is rice bran wax, which is obtained as a by-product in large volumes in the processing of raw rice (Oryza sativa). After the outer husks adhering to the grains have been removed in the threshing of the mature rice plants and further husk constituents have been separated along with other impurities in the rice mill, the grains of rice still contain the germ bud and are enclosed by the silverskin. Germ bud and silverskin are removed in a further processing step by grinding and give, as well as the polished rice, the rice bran. The rice bran contains lipid components that consist predominantly of fatty oils and of a lower percentage of waxy components. The waxy components are present in the oil obtained from the bran by pressing or solvent extraction, from which they can be isolated owing to their lack of volatility at low temperatures, for example by freezing them out. According to Journal of Scientific & Industrial Research, 2005, Vol. 64, 866-882, the calculated potential availability of rice bran wax, if the entire global production of rice were to be utilized to likewise obtain the rice bran wax as well as rice oil, would be about 300 000 tonnes per year.

According to Ullmann's Encyclopedia of Industrial Chemistry, 5th ed. 1996, Vol. A28, p. 117, rice bran wax is one of a group of waxes that has attracted only local significance or merely academic interest to date. There have been descriptions of the use of rice bran wax in cosmetics (EP-A 1343454; Bräutigam, Lexikon der kosmetischen Rohstoffe [Lexicon of Cosmetic Raw Materials], Norderstedt 2010, p. 77), as processing auxiliary in plastics (JP-A H10-007862 (1998); JP-A S60-011553 (1985); JP-A S49-090739 (1974)), and in printing inks and electrophotographic toners (JP-A 2010-020304; 2010).

In spite of numerous analytical studies with inconsistent findings, the chemical composition of rice bran wax has apparently not been fully clarified. What is certain, by contrast, is the composition of the wax body composed of wax esters.

The rice bran wax esters consist mainly of monoesters of long-chain, saturated, unbranched monocarboxylic acids with long-chain, unbranched, aliphatic monoalcohols (also called "genuine esters" hereinafter). The acid component of the rice bran wax esters has predominantly behenic and lignoceric acid, with chain lengths C22 and C24, and the alcohol component of the rice bran wax esters has predominantly chain lengths C26, C28, C30, C32 and C34. In addition, the wax may contain free fatty acids and further constituents such as squalene, phosphorus lipids and steryl esters.

The content of wax esters in refined and deoiled rice bran wax is generally greater than 96% by weight. In non-deoiled rice bran wax, the content of wax esters, according to the content of the rice bran oil, may even be only 50% by weight. Further variable constituents of the rice bran wax that are to be regarded as "trace constituents" are the otherwise unspecified "dark substances", squalene and what is called the "gum content". These components usually lead to a product quality that varies in terms of colour and employability and is difficult to reproduce.

A conventional technique for lightening the brown rice bran waxes is considered to be classic bleaching with hydrogen peroxide. Hydrogen peroxide-bleached rice bran waxes are yellowish and correspond largely to the starting waxes in terms of their ester content and in terms of their acid number. Such types are predominantly supplied on the market as deoiled and refined rice bran waxes, but likewise show varying product quality since the trace constituents remain in the product.

CN-A 108048222, CN-A 108129302 and CN-A 108191602 from 2018 describe rice bran wax oxidates that are prepared from deoiled rice bran wax by oxidation with sodium dichromate, esterified with a polyhydric alcohol (CN-A 108129302 and CN-A 108191602) and then saponified (CN-A 108191602). However, no product properties are mentioned. Owing to the esterification, it can be assumed that the acid numbers must be high.

EP-A 2909273 from 2015 discloses oxidation products of rice bran wax, prepared by oxidation with chromic acid in the presence of oxidation promoters such as fluorinated alkylsulfonic acids, aluminium trichloride or hydrochloric acid, or with particularly vigorous stirring. The aim here is to attain high acid numbers. EP-A 2909274 describes rice bran wax oxidates that are saponified before the oxidation. Here too, high acid numbers are attained.

JP-B S36-005526 (1961) describes the preparation of solvent-containing polishing compositions including a chemically modified wax based on rice bran wax. The modification is effected by oxidizing raw rice bran wax with chromic acid or dichromate salts. This achieves acid numbers of 40-45 mg KOH/g.

There is a need for a process for specific provision of rice bran wax oxidates having moderate acid numbers in the range of greater than 45 mg KOH/g and less than 70 mg KOH/g.

It has now been found that, surprisingly, through a suitable choice of process parameters in the oxidation of rice bran wax, it is specifically possible to achieve acid numbers, measured to DIN ISO 2114 (from 2002) of greater than 45 mg KOH/g and less than 70 mg KOH/g, often greater than 45 mg KOH/g and less than 65 mg KOH/g, when the proportion of polyesters formed from polyhydric alcohols and aliphatic carboxylic acids having 8 to 20 carbon atoms in the rice bran wax is less than 5% by weight.

The ester waxes have the desired acid number without any need for an additional esterification step. Such compounds have been obtainable to date only by oxidation of rice bran wax up to acid numbers in the region of about 140 mg KOH/g and subsequent esterification with polyalcohols (EP-A 2909274).

The invention therefore provides a process for producing rice bran wax oxidates (O) having an acid number of greater than 45 mg KOH/g and less than 70 mg KOH/g, comprising the steps of:

i) providing a rice bran wax (R) containing less than 5% by weight, based on the total weight of the rice bran wax (R), of polyesters formed from polyhydric alcohols and aliphatic carboxylic acids having 8 to 20 carbon atoms;

ii) providing a mixture (M) of chromium trioxide and sulfuric acid;

iii) performing the oxidation of the rice bran wax (R) by reacting the rice bran wax (R) with the mixture (M) while stirring and at a temperature of 90 to 150° C., in order to obtain a rice bran wax oxidate (O);

iv) stopping the reaction and leaving the reaction mixture obtained in step iii) to stand until the organic phase has separated from the aqueous phase;

v) separating off the organic phase;

vi) optionally removing residues containing chromium compounds from the organic phase, in order to obtain the rice bran wax oxidate (O) in purified form, vii) optionally repeating the sequence of steps ii) to vi) up to two times, using the rice bran wax oxidate (O), optionally in purified form, rather than the rice bran wax (R), wherein the oxidation in step iii) is performed over a period of 1 to 8 hours.

The rice bran wax (R) provided in step i) may be any rice bran wax, provided that it has a proportion of polyesters formed from polyhydric alcohols and aliphatic carboxylic acids having 8 to 20 carbon atoms of less than 5% by weight, preferably less than 2% by weight, more preferably 0.1% to 2% by weight, based on the total weight of the rice bran wax (R).

The desired proportion of polyesters formed from polyhydric alcohols and aliphatic carboxylic acids having 8 to 20 carbon atoms may already be present in the rice bran wax in the raw state, but may also be adjusted by a pretreatment of the rice bran wax. Preferably, the proportion is already present in the rice bran wax (R) in the raw state. In this case, it is preferable that the rice bran wax (R) is not pretreated.

If, by contrast, proportions of polyesters formed from polyhydric alcohols and aliphatic carboxylic acids having 8 to 20 carbon atoms are 5% by weight or higher, the rice bran wax (R) has to be pretreated before it is provided in step i). In this case, it is advantageous when the pretreatment does not include a saponification of the esters present in the rice bran wax (R).

Instead, preference is given to an extraction of the polyesters formed from polyhydric alcohols and aliphatic carboxylic acids having 8 to 20 carbon atoms with one or more organic solvents, wherein the extraction is performed until the desired proportion of polyesters formed from polyhydric alcohols and aliphatic carboxylic acids having 8 to 20 carbon atoms of less than 5% by weight is attained. Any organic solvents that can dissolve oils and fats are suitable, for example ethyl acetate or acetone, preferably ethyl acetate.

The polyesters formed from polyhydric alcohols and aliphatic carboxylic acids having 8 to 20 carbon atoms are preferably di- and triglycerides of aliphatic carboxylic acids having 8 to 20 carbon atoms, especially oils naturally present in rice bran, in particular rice bran oil. Correspondingly, the extraction with an organic solvent may be a deoiling. In this case, the proportion of polyesters formed from polyhydric alcohols and aliphatic carboxylic acids having 8 to 20 carbon atoms of less than 5% by weight may also be referred to as the oil content of the rice bran wax.

It is preferable that the rice bran wax (R), irrespective of the proportion of polyesters formed from polyhydric alcohols and aliphatic carboxylic acids having 8 to 20 carbon atoms in the raw state, is not pretreated by saponification at any time prior to the oxidation.

The mixture (M) of chromium trioxide and sulfuric acid provided in step ii) may be any mixture, provided that it is capable of oxidizing oxidizable constituents of rice bran wax. Frequently, such mixtures of chromium trioxide and sulfuric acid are also referred to as chromosulfuric acid.

The sulfuric acid is concentrated sulfuric acid having a proportion of sulfuric acid of at least 90% by weight, preferably at least 96% by weight, more preferably at least 99% by weight. This may optionally be fuming sulfuric acid, i.e. additionally contain sulfur trioxide. The concentration of chromium trioxide in the mixture (M) is preferably 50 to 200 g/l, more preferably 70 to 150 g/l, most preferably 80 to 120 g/l.

In step iii) of the process according to the invention, the oxidation of the rice bran wax (R) is performed by reacting the rice bran wax (R) with the mixture (M) while stirring and at a temperature of 80 to 150° C., preferably of 90 to 140° C., more preferably of 105 to 130° C., in order to obtain a rice bran wax oxidate (O).

The weight ratio of the total amount of chromium trioxide used to rice bran wax (R) used is preferably from 5:4 to 2:1 (1.25 to 2), especially from 13:10 to 17:10 (1.3 to 1.7). If the ratio is less than 5:4, the acid numbers achieved are too low. If the ratio is greater than 2:1, the acid numbers achieved are too high.

This step may optionally be divided into two or more steps. For example, step iii) may comprise the initial charging of the mixture (M) and subsequently adding the rice bran wax (R). Alternatively, step iii) may comprise the initial charging of the rice bran wax (R) and subsequently adding the mixture (M). In these cases, the addition of the respective second component (R) or (M) can be effected, for example, in portions, continuously or in one batch, preferably in portions or continuously, more preferably in portions.

Optionally, the temperature of the rice bran wax (R) and/or of the mixture (M) during the addition may deviate from the reaction temperature, and may be adjusted only after addition of the second component to the required value of 80 to 150° C., preferably of 90 to 140° C., more preferably of 105 to 130° C. For example, the temperature on addition may have a value of 70 to 130° C., preferably of 80 to 110° C. Preferably, the rice bran wax (R) is in molten form during the addition.

In one embodiment, the mixture (M) of chromium trioxide and sulfuric acid provided is initially charged and heated to a temperature of 70 to 130° C., and the rice bran wax (R) is added in portions in the solid state. On completion of addition, the temperature is adjusted to 80 to 150° C. and the oxidation is performed.

In another embodiment, the mixture (M) of chromium trioxide and sulfuric acid provided is initially charged and heated to a temperature of 70 to 130° C., and the rice bran wax (R) is added in portions in the molten state, preferably at a temperature of 70 to 130° C. On completion of addition, the temperature is adjusted to 80 to 150° C. and the oxidation is performed.

In a further embodiment, the rice bran wax (R) is initially charged and melted at a temperature of 70 to 130° C., and the mixture (M) of chromium trioxide and sulfuric acid is added in portions while cold.

On completion of addition, the temperature is adjusted to 80 to 150° C. and the oxidation is performed.

In a further embodiment, the rice bran wax (R) is initially charged and melted at a temperature of 70 to 130° C., and the mixture (M) of chromium trioxide and sulfuric acid is added in portions while hot, preferably at a temperature of 70 to 130° C. On completion of addition, the temperature is adjusted to 80 to 150° C. and the oxidation is performed.

In a further embodiment, rice bran wax (R) and the mixture (M) of chromium trioxide and sulfuric acid are initially charged together at room temperature and heated gradually to a temperature of 80 to 150° C., and the oxidation is performed at that temperature.

At least the oxidation at 80 to 150° C., preferably also the addition of the rice bran wax (R) and/or of the mixture (M), takes place with stirring. The stirring can be effected here in any desired manner, for example with a mechanically driven stirrer, or a magnetically driven stirrer. The stirring is preferably effected with a mechanically driven stirrer, more preferably with a mechanically driven stirrer comprising a precision glass stirrer.

The stirrer speed in step iii) is preferably within a range of 100 and 500 rpm (revolutions per minute), more preferably from 120 to 300 rpm, most preferably from 170 to 250 rpm, since the mixing required for efficient oxidation is absent at a stirrer speed below 100 rpm and there is an elevated risk of formation of an emulsion that cannot be separated at a stirrer speed above 500 rpm.

The oxidation of the rice bran wax in step iii) at the temperature of 90 to 150° C. is effected over a period of 1 to 8 hours, preferably of 2 to 5 hours, more preferably of 3 to 4.5 hours.

It is also advantageous when no oxidation promoters are added to the reaction mixture of rice bran wax (R) and the mixture (M), since these can frequently lead to cleavage of the ester bonds, and the acid number in the rice bran wax oxidate (O) can therefore increase. Preference is therefore given to using no oxidation promoters, especially no oxidation promoters such as, for example, emulsifiers (e.g. alkanesulfonates, fluorinated alkanesulfonates), surfactants, polymeric surfactants, nitrogen-containing cationic surfactants, phase transfer catalysts, Fenton reagents, metal salts, hydrochloric acid or the like, in the oxidation.

On attainment of the desired reaction time, in step iv), the reaction is ended and the reaction mixture is left to stand until the organic phase separates from the aqueous phase. "Ending of the reaction" is understood to mean that the stirring is stopped and the heating is ended. When this is done, the floating organic phase containing the rice bran wax oxidate (O) begins to separate from the falling aqueous phase containing sulfuric acid and chromium compounds. Before it is left to stand, it is optionally possible to transfer the reaction mixture into an apparatus which, after the separation of the organic phase from the aqueous phase, facilitates separating-off of the organic phase. One example of such an apparatus is a separating funnel. Other apparatuses for this purpose are known to the person skilled in the art and are employable here.

In step v), the organic phase containing the rice bran wax oxidate is separated off. This can be effected, for example, by means of a separating funnel. Alternatively, the floating organic phase can be skimmed off by suitable technical means. It is likewise possible to pour off the organic phase over an edge of the vessel. Methods of separating organic phases from aqueous phases after a phase separation are known in principle to the person skilled in the art and are employable here.

In addition, it is optionally possible, in step vi), to subject the organic phase containing the rice bran wax oxidate that has been separated off to further workup in order to remove residues containing chromium compounds from the organic phase and hence to obtain the rice bran wax oxidate in purified form.

The workup can be effected in any desired manner suitable for the separation of polar and/or water-soluble substances from organic substances. For example, the organic phase can be purified by chromatography or filtered through silica gel.

Preference is given to the removing of residues containing chromium compounds by washing the organic phase with an aqueous solution of oxalic acid and/or sulfuric acid.

Alternatively, residues containing chromium compounds can preferably be removed by washing the organic phase with water. Alternatively, residues containing chromium compounds can preferably be removed by centrifuging the organic phase. "Washing" is understood here in each case to mean the mixing of the organic phase with the respective washing medium, followed by phase separation according to steps iv) and v).

In a preferred embodiment, residues containing chromium compounds are removed by washing the organic phase once or more than once with an aqueous solution of oxalic acid and sulfuric acid, followed by washing the organic phase once or more than once with water.

In a further preferred embodiment, residues containing chromium compounds are removed by washing the organic phase once or more than once with an aqueous solution of oxalic acid and sulfuric acid, followed by centrifuging the organic phase.

In a further preferred embodiment, residues containing chromium compounds are removed by washing the organic phase once or more than once with water, followed by centrifuging the organic phase.

In a particularly preferred embodiment, residues containing chromium compounds are removed by washing the organic phase once or more than once with an aqueous solution of oxalic acid and sulfuric acid, followed by washing the organic phase once or more than once with water, followed by centrifuging the organic phase.

Optionally, in step vii), the sequence of steps ii) to vi) can be repeated up to two times, using the rice bran wax oxidate (O), optionally in purified form, rather than the rice bran wax (R). Preferably, in step vii), the sequence of steps ii) to vi) is repeated no more than once. In these cases, at least half of the total amount of chromium trioxide provided is used in the first performance of steps ii) to vi), and the remaining portion in repetitions of steps ii) to vi). Particularly preferably, the sequence of steps ii) to vi) is not repeated.

The invention further provides a rice bran wax oxidate (O) having an acid number (measured to DIN ISO 2114 of 2002) of greater than 45 mg KOH/g and less than 70 mg KOH/g, produced by the process according to the invention. Preferably, the rice bran wax oxidate has an acid number of greater than 45 mg KOH/g and less than 65 mg KOH/g.

The invention likewise provides a rice bran wax oxidate (O) having an acid number of greater than 45 mg KOH/g and less than 70 mg KOH/g, preferably less than 65 mg KOH/g, and having a proportion of polyesters formed from polyhydric alcohols and aliphatic carboxylic acids having 22 to 36 carbon atoms of less than 5% by weight, based on the total weight of the rice bran wax oxidate (O).

The rice bran wax oxidate (O) according to the invention preferably has a proportion of polyesters formed from polyhydric alcohols and aliphatic carboxylic acids having 22 to 36 carbon atoms of less than 5% by weight, more preferably less than 3% by weight, most preferably less than 1% by weight, based on the total weight of the rice bran wax oxidate (O).

In one embodiment, the rice bran wax oxidate (O) contains
a) 10% to 40% by weight, based on the total weight of the rice bran wax oxidate (O), of free aliphatic carboxylic acids having 8 to 36 carbon atoms;
b) 0% to 5% by weight, based on the total weight of the rice bran wax oxidate (O), of free aliphatic alcohols having 24 to 36 carbon atoms;
c) 0% to 10% by weight, based on the total weight of the rice bran wax oxidate (O), of free aliphatic dicarboxylic acids having 10 to 30 carbon atoms;
d) 45% to 90% by weight, based on the total weight of the rice bran wax oxidate (O), of genuine esters having 42 to 64 carbon atoms; and
e) 0% to 15% by weight, based on the total weight of the rice bran wax oxidate (O), of further natural constituents present in the rice bran wax.

In a preferred embodiment, the rice bran wax oxidate (O) contains
a) 13% to 35% by weight, based on the total weight of the rice bran wax oxidate (O), of free aliphatic carboxylic acids having 8 to 36 carbon atoms;
b) 0% to 3% by weight, based on the total weight of the rice bran wax oxidate (O), of free aliphatic alcohols having 24 to 36 carbon atoms;
c) 0% to 4% by weight, based on the total weight of the rice bran wax oxidate (O), of free aliphatic dicarboxylic acids having 10 to 30 carbon atoms;
d) 50% to 87% by weight, based on the total weight of the rice bran wax oxidate (O), of genuine esters having 42 to 64 carbon atoms; and
e) 0% to 15% by weight, based on the total weight of the rice bran wax oxidate (O), of further natural constituents present in the rice bran wax.

In a preferred embodiment, the rice bran wax oxidate (O) contains
a) 15% to 30% by weight, based on the total weight of the rice bran wax oxidate (O), of free aliphatic carboxylic acids having 8 to 36 carbon atoms;
b) 0% to 1% by weight, based on the total weight of the rice bran wax oxidate (O), of free aliphatic alcohols having 24 to 36 carbon atoms;
c) 0% to 3% by weight, based on the total weight of the rice bran wax oxidate (O), of free aliphatic dicarboxylic acids having 10 to 30 carbon atoms;
d) 55% to 85% by weight, based on the total weight of the rice bran wax oxidate (O), of genuine esters having 42 to 64 carbon atoms; and
e) 0% to 15% by weight, based on the total weight of the rice bran wax oxidate (O), of further natural constituents present in the rice bran wax.

Preferably, lignoceric acid is present here in the rice bran wax oxidate (O) to an extent of not more than 5% by weight, more preferably not more than 3% by weight, based on the total weight of the rice bran wax oxidate (O).

The proportions by weight and chain length distributions can be measured, for example, by means of gas chromatography.

In addition, the rice bran wax oxidates according to the invention typically have a dropping point measured to DIN ISO 2176 (1997) of between 70° C. and 90° C., preferably between 75° C. and 80° C.

Preferably, the rice bran wax oxidates according to the invention, compared to conventional oxidates (for example based on montan wax), have a particularly light to white colour. The colour can be determined from the iodine colour number measured to DIN 6162 (2014). In the case of the rice bran wax oxidates according to the invention, it is less than 20, preferably less than 6, especially less than 2.

The rice bran wax oxidates according to the invention preferably have a needle penetration index (NPI) measured to DIN 51579 (2010) of less than 10 mm$^{-1}$, preferably less than 5 mm$^{-1}$, more preferably less than 3 mm$^{-1}$.

The oxidation of the rice bran wax preferably increases the saponification number measured to DIN ISO 3681 (2007) by not more than 40%, preferably by not more than 30%, more preferably by not more than 20%. The increase in the saponification number can be explained mechanistically by the cleavage of the wax esters and the subsequent oxidation of the wax alcohols to acids. In addition, a portion of unsaturated carbon-carbon bonds is cleaved by the oxidizing agent and likewise oxidized up to acids.

Thus, the saponification number is also a measure of the oxidation that has actually taken place, as opposed to saponification in which the saponification number does not change, as is well known, and as opposed to other bleaching methods in which there is merely lightening of the product. For example, the effect of the bleaching of rice bran wax with hydrogen peroxide is not a chemical modification of the wax for the purposes of the invention, since merely discolouring impurities and secondary constituents are removed here without altering the actual wax structure.

The rice bran wax oxidate (O) according to the invention typically features particularly good thermal stability, measured to DIN 51006 (2005) with a loss of mass up to the attainment of a temperature of 300° C. (heating rate: 5° C./min) of less than 25%, preferably less than 20%, particularly preferably less than 17%.

The invention further provides a saponified rice bran wax oxidate (V) produced by saponifying the above-described rice bran wax oxidate (O) with a basic metal salt selected from the group consisting of metal hydroxides (e.g. NaOH, KOH, Ca(OH)$_2$ and Zn(OH)$_2$, etc.), metal oxides (e.g. CaO, etc.), metal carbonates (e.g. Na$_2$CO$_3$, CaCO$_3$, etc.) or with aqueous alkalis (e.g. NaOH, KOH, etc.). Preference is given to alkali metal hydroxides and/or alkaline earth metal hydroxides, especially NaOH, KOH and/or Ca(OH)$_2$.

Corresponding preparation methods can be found, for instance, in DE4019167. The saponified products preferably feature, as well as the renewable raw material basis, particularly good thermal stability, measured to DIN 51006 with a loss of mass up to the attainment of a temperature of 300° C. (heating rate: 5° C./min) of less than 10%, preferably less than 5%.

The invention likewise provides for the use of the rice bran wax oxidates (O) according to the invention or of the saponified rice bran wax oxidates (V) according to the invention for agricultural or forestry purposes, as additive in plastics processing, in care products, in printing inks and/or in paints.

The invention is elucidated in detail by the examples and claims which follow.

Substance Characterization

The standard methods detailed in table 1, which are also employed in the characterization of montan waxes and montan wax derivatives, serve for determination of the indices of rice bran waxes, rice bran wax oxidates and further derivatives of the rice bran waxes.

TABLE 1

|  | Method |
|---|---|
| Acid number (AN) [mg KOH/g] | ISO 2114 |
| Saponification number (SN) [mg KOH/g] | ISO 3681 |
| Dropping point (DP) [° C.] | ISO 2176 |
| Melting point (MP) [° C.] | DIN EN ISO 11357-1 |
| Enthalpy of fusion (EF) [J/g] | DIN EN ISO 11357-1 |
| Oil content (OC) [% by wt.] | AOCS Ja 4-46 |
| Thermogravimetric analysis (TGA) [% by weight] from 25 to 300° C. at 5K/min, then 30 min at 300° C. Measurement of loss of mass on attainment of 300° C. and after 30 min at 300° C. | DIN 51006 |
| Iodine colour number (ICN) | DIN 6162 |
| Ca content [% by wt.] (CaC) | DGF M-IV 4 |
| Needle penetration index [mm$^{-1}$] (NPI) | DIN 51579 |

Chain Length Distributions

The chain length distributions of the constituents of the rice bran wax oxidates were determined by means of gas chromatography. The comparative substances used were wax acids and wax alcohols having carbon chain lengths between C6 and C36. Wax esters with C44 to C58 were prepared by combination of the model substances. In order to identify the peaks of the gas chromatograms of the rice bran waxes, a defined amount of the individual components in each case was added to a wax sample and a distinct increase in the area of the corresponding peak was observed. The measurement conditions are shown in table 2.

TABLE 2

| Column | Agilent Technologies HP-1 (DB-1) length 15 m I.D.0.25 mm film 0.10 µm |
|---|---|
| Detector | 310° C. FID |
| Injector | 300° C. split 1:100 |
| Carrier gas | helium |
| Solvent | toluene |

TABLE 2-continued

| Concentration | 30 mg/ml |
|---|---|
| Injection volume | 1 µl |
| Temperature program | 40 to 320° C. at 5K/min; hold at 320° C. for 50 min |

The raw material used was a rice bran wax (RBW 1) in the raw state. The properties of the rice bran wax in the raw state are shown in Table 3.

TABLE 3

(methods, abbreviations and units in Table 1)

| Raw material | AN | SN | DP | MP | EF | OC | TGA |
|---|---|---|---|---|---|---|---|
| RBW 1 | 1.3 | 83 | 77 | 79 | −192 | 1.9 | 1.2/6.4 |

EXAMPLES 1 TO 3

A 3 l reaction vessel equipped with stirrer, temperature sensor, dropping funnel and reflux condenser was initially charged with the amount of chromium trioxide in sulfuric acid (concentration: 100 g CrO$_3$/l) specified in Table 4, and heated to 100° C. Subsequently, molten (90° C.) rice bran wax was added in portions in the raw state. The temperature of the reaction mixture was adjusted to 110° C., and the reaction mixture was stirred with a precision glass stirrer at about 200 rpm for 4 h. The heating and stirring were switched off. As soon as the phases had separated, the aqueous phase was separated off.

The organic phase was freed of chromium residues by washing with an aqueous solution of oxalic acid and sulfuric acid and then by washing with water, discharged into warm centrifuge bottles and centrifuged.

The conditions of the oxidations and properties of the rice bran wax oxidates are reported in Table 4.

TABLE 4

|  | Example | | |
|---|---|---|---|
|  | 1 | 2 | 3 |
| RBW 1 [g] | 150 | 150 | 150 |
| CrO$_3$/H$_2$SO$_4$ [L] | 1.95 | 2.25 | 2.55 |
| Reaction time [h] | 4 | 4 | 4 |
| Reaction temperature [° C.] | 110 | 110 | 110 |
| Time [min] before phase separation | 2 | 2 | 2 |
| AN | 45.7 | 52.2 | 64.1 |
| SN | 106 | 113 | 116 |
| DP | 77 | 78 | 76 |
| MP | 81 | 79 | 80 |
| EF | −229.69 | −225.74 | −227.14 |
| TGA | 11.21/28.91 | 14.61/35.22 | 16.51/39.13 |
| ICN | 1.4 | 0.3 | 0.2 |
| NPI | 2 | 3 | 3 |

The invention claimed is:

1. A process for producing rice bran wax oxidates (O) having an acid number of greater than 45 mg KOH/g and less than 70 mg KOH/g, comprising the steps of:
   i.) providing a rice bran wax (R) containing less than 5% by weight, based on the total weight of the rice bran wax (R), of polyesters formed from polyhydric alcohols and aliphatic carboxylic acids having 8 to 20 carbon atoms;

ii.) providing a mixture (M) of chromium trioxide and sulfuric acid;

iii.) performing an oxidation of the rice bran wax (R) by reacting the rice bran wax (R) with the mixture (M) while stirring and at a temperature of 90 to 150° C., in order to obtain a reaction mixture containing a rice bran wax oxidate (O);

iv.) stopping the reaction and leaving the reaction mixture obtained in step iii) to stand until an organic phase has separated from an aqueous phase;

v.) separating off the organic phase;

vi.) optionally removing residues containing chromium compounds from the organic phase, in order to obtain the rice bran wax oxidate (O) in purified form; and vii.) optionally repeating the sequence of steps ii) to vi) up to two times, using the rice bran wax oxidate (O), optionally in purified form, rather than the rice bran wax (R), wherein the oxidation in step iii) is performed over a period of 1 to 8 hours.

2. The process according to claim 1, wherein a weight ratio of the total amount of chromium trioxide used to rice bran wax (R) used is from 5:4 to 2:1.

3. The process according to claim 1, wherein the removing of residues containing chromium compounds in step vi) is performed and comprises the washing of the organic phase with an aqueous solution of oxalic acid and/or sulfuric acid.

4. The process according to claim 1, wherein the removing of residues containing chromium compounds in step vi) is performed and comprises the washing of the organic phase with water.

5. The process according to claim 1, wherein the removing of residues containing chromium compounds in step vi) is performed and comprises centrifuging of the organic phase.

6. The process according to claim 1, wherein chromium trioxide is present in the mixture (M) at a concentration of from 50 to 200 g/L.

7. The process according to claim 1, wherein the oxidation in step iii) is performed over a period of 2 to 5 hours.

8. The process according to claim 1, wherein the stirrer speed in step iii) is between 100 and 500 rpm.

9. The process according to claim 1, wherein no additional oxidation promoters are added to the reaction mixture.

10. A rice bran wax oxidate (O) having an acid number of greater than 45 mg KOH/g and less than 70 mg KOH/g, prepared by the process according to claim 1.

11. The rice bran wax oxidate (O) according to claim 10 having a proportion of polyesters formed from polyhydric alcohols and aliphatic carboxylic acids having 22 to 36 carbon atoms of is less than 5% by weight, based on the total weight of the rice bran wax oxidate (O).

12. A rice bran wax oxidate (O) having an acid number of greater than 45 mg KOH/g and less than 70 mg KOH/g and having a proportion of polyesters formed from polyhydric alcohols and aliphatic acids having 22 to 36 carbon atoms of less than 5% by weight, based on the total weight of the rice bran wax oxidate (O).

13. The rice bran wax oxidate (O) according to claim 11 comprising:
a) 10% to 40% by weight, based on the total weight of the rice bran wax oxidate (O), of free aliphatic carboxylic acids having 8 to 36 carbon atoms;
b) 0% to 5% by weight, based on the total weight of the rice bran wax oxidate (O), of free aliphatic alcohols having 24 to 36 carbon atoms;
c) 0% to 10% by weight, based on the total weight of the rice bran wax oxidate (O), of free aliphatic dicarboxylic acids having 10 to 30 carbon atoms;
d) 45% to 90% by weight, based on the total weight of the rice bran wax oxidate (O), of genuine esters having 42 to 64 carbon atoms; and
e) 0% to 15% by weight, based on the total weight of the rice bran wax oxidate (O), of further natural constituents present in the rice bran wax.

14. The rice bran wax oxidate (O) according to claim 10 containing not more than 10% by weight, based on the total weight of the rice bran wax oxidate (O), of lignoceric acid.

15. A saponified rice bran wax oxidate produced by saponifying the rice bran wax oxidate (O) according to claim 1 with a basic metal salt.

16. The rice bran wax oxidate (O) according to claim 12 comprising:
a) 10% to 40% by weight, based on the total weight of the rice bran wax oxidate (O), of free aliphatic carboxylic acids having 8 to 36 carbon atoms;
b) 0% to 5% by weight, based on the total weight of the rice bran wax oxidate (O), of free aliphatic alcohols having 24 to 36 carbon atoms;
c) 0% to 10% by weight, based on the total weight of the rice bran wax oxidate (O), of free aliphatic dicarboxylic acids having 10 to 30 carbon atoms;
d) 45% to 90% by weight, based on the total weight of the rice bran wax oxidate (O), of genuine esters having 42 to 64 carbon atoms; and
e) 0% to 15% by weight, based on the total weight of the rice bran wax oxidate (O), of further natural constituents present in the rice bran wax.

17. A saponified rice bran wax oxidate produced by saponifying the rice bran wax oxidate (O) according to claim 12 with a basic metal salt.

18. The process according to claim 1, wherein a weight ratio of the total amount of chromium trioxide used to rice bran wax (R) used is from 13:10 to 17:10.

19. The rice bran wax oxidate (O) according to claim 12 having a proportion of polyesters formed from polyhydric alcohols and aliphatic carboxylic acids having 22 to 36 carbon atoms of less than 3% by weight, based on the total weight of the rice bran wax oxidate (O).

20. The rice bran wax oxidate (O) according to claim 12 having a proportion of polyesters formed from polyhydric alcohols and aliphatic carboxylic acids having 22 to 36 carbon atoms of less than 1% by weight, based on the total weight of the rice bran wax oxidate (O).

* * * * *